Figure 1:
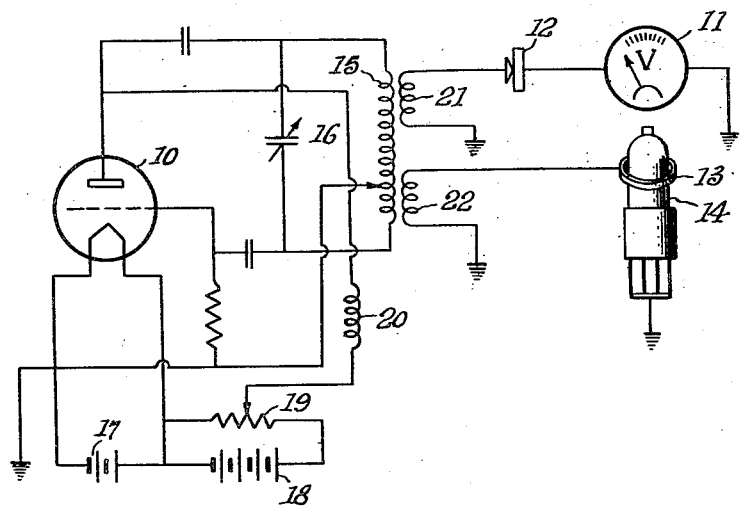

Nov. 14, 1950 — M. L. YEATER — 2,530,111
METHOD AND MEANS FOR INDICATING IONIZATION PRESSURE
Original Filed Oct. 10, 1944

INVENTOR.
Max L. Yeater
BY Harry M. Saragovitz
ATTORNEY

UNITED STATES PATENT OFFICE 2,530,111

METHOD AND MEANS FOR INDICATING IONIZATION PRESSURE

Max L. Yeater, Cambridge, Mass., assignor, by mesne assignments, to the United States of America as represented by the Secretary of War Original application October 10, 1944, Serial No. 558,052. Divided and this application April 12, 1950, Serial No. 158,762

4 Claims. (Cl. 175—183)

This application is a division of my co-pending application, Serial Number 558,052, filed October 10, 1944, for "Ionization Pressure Gauge," now Patent No. 2,519,807, issued August 22, 1950.

The present invention pertains to the measurement of vacua and more particularly to ionization manometers for measuring gas pressure in thermionic vacuum and semi-vacuum tubes.

In the measurement of low pressure gases, the manometer most commonly employed for this purpose is the McLeod gauge whose operation depends on Boyles law and entails the use of mercury columns in capillary tubes for compressing a sample volume of gas under test. Another widely used manometer is the Pirani gauge whose operation is based upon the physical principles that the thermal conductively of gas is a function of its pressure. The thermal conductivity is indirectly measured by ascertaining the change in resistance of a hot filament in a vacuum with pressure. As the pressure round the filament alters, so the speed at which heat is conducted away from the filament changes. This effect changes the filament temperature and hence its resistance. The resistance changes are recorded by a Wheatstone bridge arrangement.

Another method by which gas pressure may be measured is by the use of ionization gauges wherein the electrons from a heated filament in a vacuum bulb are accelerated toward a collecting electrode while the positive ions formed during their passage are collected on a third electrode and the current recorded varies with the pressure prevailing in the bulb.

In recent years with the large scale production of vacuum and semi-vacuum thermionic tubes it has become increasingly desirable to measure gas pressure within a tube after the tube envelope has been sealed off. None of the measuring techniques above mentioned is capable of performing this operation since, in all cases, a sample of the gas must be introduced into the instrument. Moreover, since gas pressures in the order of one millimeter of mercury or less are encountered, or more specifically, in the range between 100 and 1000 microns, manometers hitherto available have not always been satisfactorily accurate at these pressures.

Accordingly it is the principal object of the present invention to provide an ionization gauge for measuring gas pressure in a vessel which has been sealed off.

It is another object of the present invention to provide an ionization gauge of the above type characterized by a higher degree of accuracy than has heretofore been available.

It is a further object of the invention to provide a pressure gauge which is simple both in construction and operation and which may be readily calibrated. The technique employed in the present invention is based on the phenomenon that a low pressure gas will evidence a glow discharge between the electrodes of an electromagnetic wave oscillator if the voltage and frequency are of the proper magnitude. If the voltage is maintained constant there is a minimum frequency at which the glow discharge appears, for a given gas pressure.

The objects of this invention are fulfilled in this embodiment wherein the sealed-off, low pressure, gas-filled tube is brought within the field of a radio frequency generator whose output voltage is constant while the frequency is changed. The frequency is raised to the point of glow discharge, as indicated either visually or by means of a monitor circuit. Since the point at which glow discharge first occurs is a function of gas pressure, by calibrating the frequency adjusting means the gas pressure within the vessel may be directly indicated.

For a better understanding of the invention, together with other and further objects thereof, reference is had to the following description taken in connection with the accompanying drawing. The scope of the invention will be pointed out in the accompanying claims.

Figure 2:
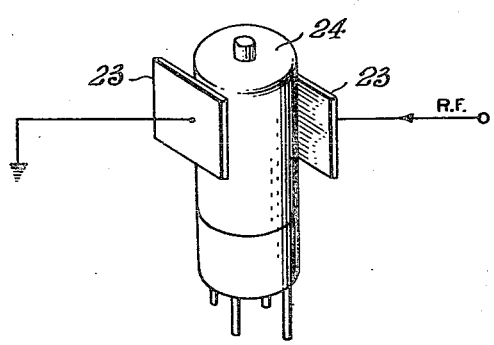

In the accompanying drawing:

Figure 1 is a schematic circuit diagram of a preferred embodiment of the invention, and Figure 2 is an alternative electrode arrangement to be employed with the circuit of Figure 1.

Referring now to the drawing and more particularly to Figure 1 a preferred embodiment of the invention is disclosed comprising a Hartley oscillator including a triode tube 10, a monitor circuit including a voltmeter 11 and a half-wave rectifier 12, and a testing circuit including a metal testing ring 13. The vacuum tube under test 14 is disposed within the ring 13, all of the elements therein being grounded through the connecting prongs.

The Hartley oscillator is of conventional design having a tank circuit formed by inductor 15 and variable capacitor 16, filament voltage for triode 10 is furnished by battery 17 while plate voltage is provide by battery 18. The power output of the oscillator is controlled by a potentiometer 19 shunted across battery 18, the sliding arm being connected through a radio frequency choke 20 to the plate of triode 10. The output of the oscillator is inductively coupled to the monitor and test circuits by coils 21 and 22 respectively. One side of coil 21 is grounded, the other side being connected, through rectifier 12, to one terminal of a voltmeter 11, the other terminal thereof being grounded. One side of coil 22 is grounded, the other side being connected to the testing loop 13.

In operation, potentiometer 19 is adjusted to a desired output voltage of the oscillator. When condenser 16 is varied as to increase the frequency of the oscillator, a point will be reached where the radio frequency potential applied to tube 14 is sufficient to ionize the low pressure gaseous region therein. The ionization of tube 14 applies a relatively heavy load across the output of the oscillator which is indicated by voltmeter 11 which abruptly dips when the output of the oscillator is absorbed by the test circuit. The point of ionization will also, of course, be visually evident because of the glow of tube 14. The minimum frequency at which the glow discharge first appears is a function of pressure for a given frequency. To calibrate the circuit in terms of gas pressure the readings may be compared with a standard McLeod gauge.

Although in the method disclosed in Figure 1 the elements within the tube are used to provide an electrode whereby the radio frequency voltages are impressed upon the gaseous region of tube 14, this particular method is not essential to the operation of the ionization gauge. Referring to Figure 2 an alternative method is shown wherein the radio frequency voltages are applied to a thermionic tube 23 through a pair of external electrodes 24, the circuit in all other respects being identical with that illustrated in Figure 1.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

I claim:

1. Apparatus for measuring gas pressure in a sealed-off vessel comprising an oscillatory wave generator, output electrodes for said generator disposed about the sealed-off vessel, means for adjusting the frequency of said generator to the point of ionization of the gas contained within the vessel while the power output of said generator is maintained substantially constant, and means for indicating the frequency of said generator when said point of ionization is attained as a measure of said pressure.

2. Apparatus for measuring gas pressure in a sealed-off vessel having metallic elements therein, said apparatus comprising an oscillatory wave generator, output electrodes for said generator, one of said output electrodes comprising a metallic member disposed externally of said vessel, the other of said output electrodes comprising the elements within said vessel, means for adjusting the frequency of said generator to the point of ionization of the gas contained within the vessel while maintaining the power output substantially constant, and means for indicating the frequency of said generator when said point of ionization is attained as a measure of said pressure.

3. The method of measuring gas pressure in a closed envelope comprising the steps of applying a high frequency electromagnetic field of substantially constant voltage to the gas, and indicating the frequency of said field at ionization of said gas to indicate said pressure.

4. A device for measuring the gas pressure within a closed container comprising a high frequency oscillator capable of generating an electromagnetic wave of substantially constant voltage, means for varying the frequency of said oscillator, means for applying said wave to the gas in said container and means to indicate said frequency substantially at the point of ionization of said gas as a measure of said pressure.

MAX L. YEATER.

No references cited.